(12) United States Patent
Yamazaki et al.

(10) Patent No.: US 6,337,473 B2
(45) Date of Patent: Jan. 8, 2002

(54) BEAM POSITION DETECTOR HAVING A PHOTODETECTION UNIT

(75) Inventors: Takaaki Yamazaki; Ken-ichiro Yoshino, both of Tokyo-to (JP)

(73) Assignee: Kabushiki Kaisha Topcon, Tokyo-to (JP)

( * ) Notice: Subject to any disclaimer, the term of this patent is extended or adjusted under 35 U.S.C. 154(b) by 0 days.

(21) Appl. No.: 09/181,255

(22) Filed: Oct. 28, 1998

(30) Foreign Application Priority Data

Nov. 11, 1997 (JP) .............................. 9-325310

(51) Int. Cl.$^7$ .............................. G01C 21/02
(52) U.S. Cl. .................. 250/206.1; 250/208.1; 356/4.08
(58) Field of Search .............. 250/206.2, 206.1, 250/214 R, 208.1, 208.6; 356/222, 4.08, 400; 33/293

(56) References Cited

U.S. PATENT DOCUMENTS 4,907,874 A  3/1990  Ake .............................. 356/4
4,976,538 A * 12/1990 Ake .............................. 356/4
5,567,976 A * 10/1996 Dierschke et al. .......... 257/443

* cited by examiner

Primary Examiner—Que T. Le
Assistant Examiner—Thanh X. Luu
(74) Attorney, Agent, or Firm—Nields & Lemack (57) ABSTRACT

A beam position detector, which comprises a photodetection unit for receiving a laser beam and issuing a signal corresponding to photodetection amount, wherein said photodetection unit has a first photoelectric conversion unit and a second photoelectric conversion unit and width of said first photoelectric conversion unit is gradually decreased in positive position detecting direction, and width of said second photoelectric conversion unit is gradually increased in positive position detecting direction, and scanning position of the laser beam is detected by comparing the output value of said first photoelectric conversion unit with the output value of said second photoelectric conversion unit.

4 Claims, 5 Drawing Sheets

BEAM POSITION DETECTOR HAVING A PHOTODETECTION UNIT

BACKGROUND OF THE INVENTION

The present invention relates to a beam position detector for receiving a laser beam from a rotary laser irradiating apparatus, which projects the laser beam by rotary irradiation, and for displaying a photodetecting position.

In the field of civil engineering and architectural engineering, a laser survey system is used to form a reference plane. The laser survey system comprises a rotary laser irradiating apparatus and a beam position detector, and a laser beam is projected for rotary scanning from the rotary laser irradiating apparatus. By the laser beam, a reference plane is formed, and a scanning position of the laser beam is detected by the beam position detector.

Figure 6:
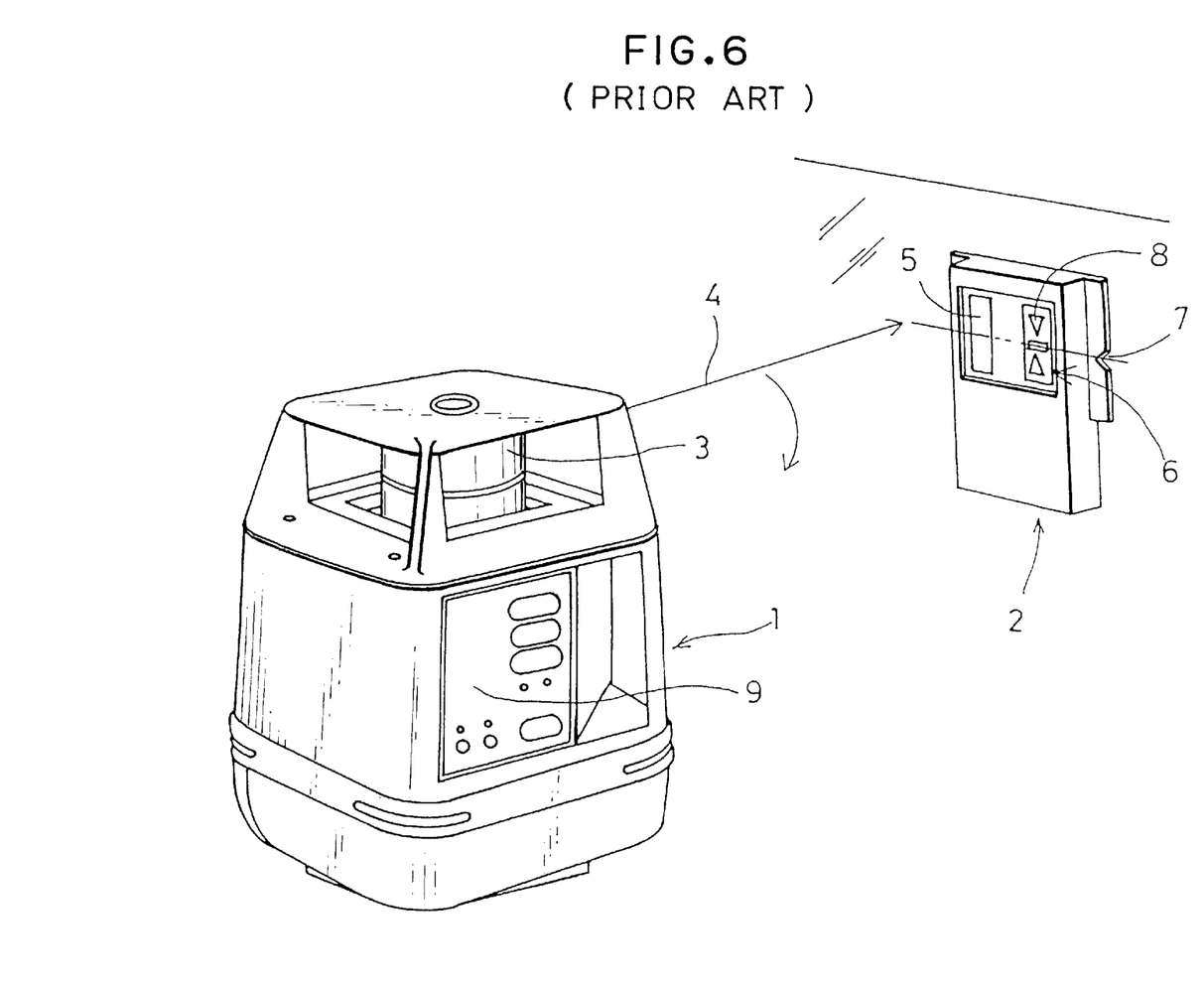
FIG. 6 is a perspective view of a laser survey system provided with the beam position detector.

Now, description will be given on a laser survey system referring to FIG. 6.

In this figure, reference numeral 1 represents a rotary laser irradiating apparatus, and 2 represents a beam position detector.

The rotary laser irradiating apparatus 1 is installed on a tripod (not shown). The rotary laser irradiating apparatus 1 has a rotator 3 on its upper portion. From the rotator 3, a laser beam 4 is projected in horizontal direction and is rotated for total circumferential scanning. On the rotary laser irradiating apparatus 1, an operation panel 9 for defining leveling operation, scanning speed of the laser beam and range of scanning, etc. and for operating the rotary laser irradiating apparatus 1 is provided.

The beam position detector 2 comprises a photodetection unit 5 for detecting the laser beam and a display unit 6 for displaying a photodetecting position. On each of the lateral ends of the beam position detector 2, a notch 7 is formed.

At an irradiating position of the laser beam 4 on wall surface, for example, the beam position detector 2 is supported. The photodetection unit 5 detects a passing position when the laser beam passes through. The display unit 6 notifies that the irradiating position of the laser beam 4 with respect to the beam position detector 2 is adequate based on the results of detection by the photodetection unit 5. If the position is deviated, it notifies a direction of deviation or a direction to be corrected by a display pattern 8. In case the position of the beam position detector 2 is adequate and not deviated, a mark is put using the notch 7. The mark thus formed serves as an index for a reference position.

Next, description will be given on the beam position detector 2.

Figure 7A:
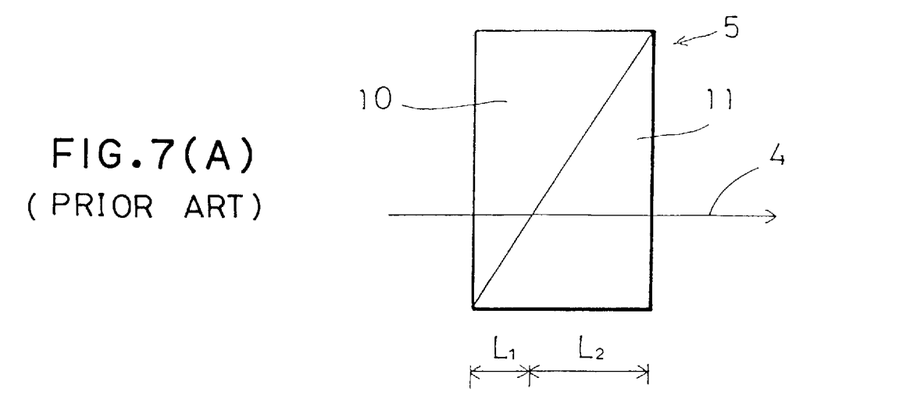
Figure 7B:
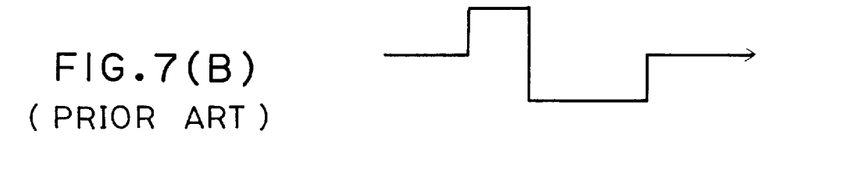

As shown in FIG. 7 (A) and FIG. 7 (B), the photodetection unit 5 of the beam position detector 2 is divided to a first photoelectric conversion unit 10 and a second photoelectric conversion unit 11. The first photoelectric conversion unit 10 and the second photoelectric conversion unit 11 are both designed in triangular shape and are at positions of point symmetry to each other.

Referring to FIG. 7 (A) and FIG. 7 (B), description will be given now on photodetecting status on the photodetection unit 5 and further on scanning position detecting status of the laser beam.

When the laser beam 4 scans over the photodetection unit 5, lengths L1 and L2 of line segments, along which the laser beam 4 goes across the first photoelectric conversion unit 10 and the second photoelectric conversion unit 11, vary according to vertical position of the photodetection unit 5. If the laser beam 4 goes across the graphical center of the photodetection unit 5, the line segments are given as: L1=L2. If the scanning position of the laser beam 4 is deviated from the graphical center of the photodetection unit 5, e.g. in case it is lower than the graphical center, the following relationship exists: L1<L2.

Photodetection amount (or received light quantity) of each of the first photoelectric conversion unit 10 and the second photoelectric conversion unit 11 is proportional to the length of the line segment, along which the laser beam 4 is projected, and output value of each of the first photoelectric conversion unit 10 and the second photoelectric conversion unit 11 is proportional to the photodetection amount respectively. By comparing signal level of relative ratio of the output value from each of the first photoelectric conversion unit 10 and the second photoelectric conversion unit 11, it is possible to determine the scanning position of the laser beam 4 with respect to the photodetection unit 5. As described above, in case the scanning position of the laser beam 4 is deviated from and lower than the graphical center of the photodetection unit 5, and if the first maximum photodetection amount is compared with the first maximum photodetection amount, output value from the first photoelectric conversion unit 10 is lower, and output value from the second photoelectric conversion unit 11 is higher.

By comparing the output value of the first photoelectric conversion unit 10 with that of the second photoelectric conversion unit 11, it is possible to determine the scanning position of the laser beam 4. Also, according to the display on the display unit 6 as described above, a position to set the beam position detector 2 is also found.

As described above, in the beam position detector 2, the difference of the photodetection amount between the first photoelectric conversion unit 10 and the second photoelectric conversion unit 11 (i.e. the difference between the first maximum photodetection value and the second maximum photodetection value) is compared, and the scanning position of the laser beam with respect to the photodetection unit 5 is detected. In this way, by detecting relative value of the output of the photoelectric conversion units, it is possible to accurately detect the scanning position even when intensity of the laser beam itself is low and regardless of the size of diameter of the laser beam.

Figure 8A:
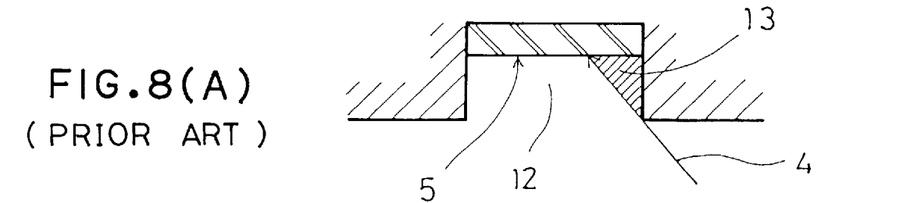
Figures 8B, 8C:
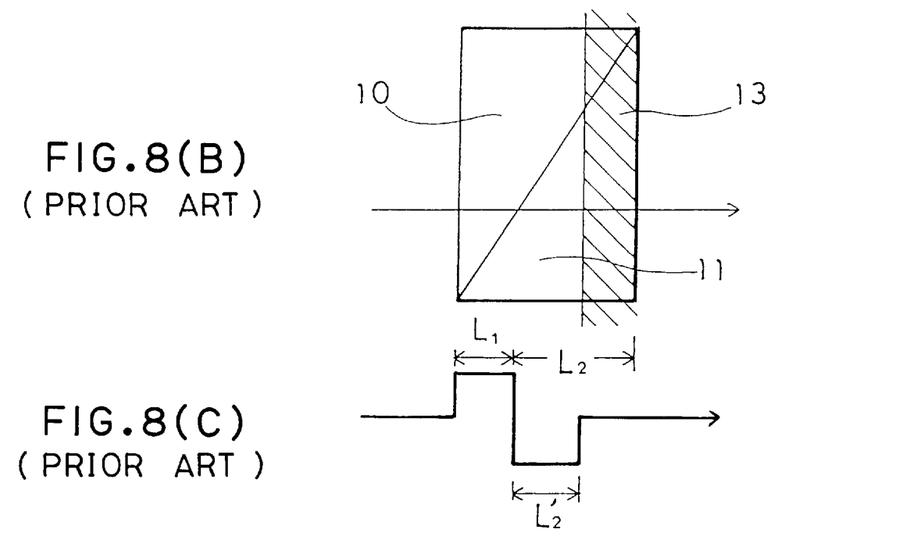

However, as shown in FIG. 8 (A), the photodetection unit 5 is usually placed at retreated position with respect to a photodetection window 12 of the beam position detector 2. There is no problem in case the laser beam 4 is projected perpendicularly to the photodetection unit 5, but if the laser beam 4 enters obliquely as shown in FIG. 8 (A) or FIG. 8 (B), a shadow 13 is formed by the beam position detector 2 itself. In case the laser beam 4 is scanned with the shadow 13 formed in this way, the second photoelectric conversion unit 11 does not detect the laser beam 4 in the shadow 13. As a result, the length of line segment of the laser beam 4 detected by the second photoelectric conversion unit 11 is turned to L2', exempting the portion of the shadow 13, and this is shorter than the length of the line segment L2, along which the beam actually is projected. Therefore, this means that relative value of the photodetection amount extensively varies between the first photoelectric conversion unit 10 and the second photoelectric conversion unit 11. This leads to the decrease of the accuracy to detect the scanning position of the laser beam 4 by the beam position detector 2.

SUMMARY OF THE INVENTION

It is an object of the present invention to provide a beam position detector, by which it is possible to perform accurate position detection without being influenced by the shadow even when a laser beam is not projected perpendicularly toward the photodetection unit.

To attain the above object, the beam position detector, according to the present invention comprises a photodetection unit for receiving a laser beam and issuing a signal corresponding to photodetection amount, wherein said photodetection unit is divided to divided portions symmetrical to each other by a division line running perpendicularly with respect to position detecting direction, said divided portions are further subdivided to a plurality of subdivided sectors, some of the subdivided sectors of one of the divided portions and some of the subdivided sectors of the other of the divided portions constitute a first photoelectric conversion unit, the rest of the subdivided sectors of one of the divided portions and the rest of the subdivided sectors of the other of the divided portions constitute a second photoelectric conversion unit, and width of said first photoelectric conversion unit is gradually decreased in positive position detecting direction, and width of said second photoelectric conversion unit is gradually increased in positive position detecting direction. Also, the present invention provides the beam position detector comprises a photodetection unit for receiving a laser beam and issuing a signal corresponding to photodetection amount, wherein the photodetection unit is divided to divided portions symmetrical to each other by a division line running perpendicularly with respect to position detecting direction, the divided portions are further subdivided to a plurality of subdivided sectors, at least one of the subdivided sectors of one of the divided portions has a geometrical form having a part of the division line as a base thereof and having a portion with width thereof gradually decreased in positive position detecting direction, and at least one of the subdivided sectors of the other of the divided portions has the base in common and has a geometrical form having width thereof gradually decreased in negative position detecting direction, wherein the geometrical form having width thereof gradually decreased in positive position detecting direction of one of the divided portions and the geometrical forms except the forms having width thereof gradually decreased in negative position detecting direction of the other of the divided portions constitute a first photoelectric conversion unit, the geometrical form with width thereof gradually decreased in negative position detecting direction of the other of the divided portions and geometrical forms except the forms having width thereof gradually decreased in positive position detecting direction of one of the divided portions constitute a second photoelectric conversion unit, and width of the first photoelectric conversion unit is gradually decreased in positive position detecting direction, and width of the second photoelectric conversion unit is gradually increased in positive position detecting direction. Further, the present invention provides the beam position detector as described above, wherein the division line is further divided so that the base is equal to the remaining part of the division line except the base. Also, the present invention provides the beam position detector as described above, wherein divided forms of two divided portions are symmetrical to each other with respect to the division line. The present invention further provides the beam position detector as described above, wherein the photodetection unit has a symmetrical line running perpendicularly to the division line and the divided forms are symmetrical to each other with respect to a symmetrical line. The invention further provides the beam position detector as described above, wherein variation amount of width of the first photoelectric conversion unit and variation amount of width of the second photoelectric conversion unit have a higher change ratio near the division line. The present invention also provides the beam position detector, wherein the geometrical form having a part of the division line as a base thereof and having a portion gradually decreased in position detecting direction has two divided line segments in the central portion of the division line divided into four line segments with equal length as a base thereof. The present invention also provides the beam position detector as described above, wherein the division line is divided into four divided segments with equal length, and the two divided portions have respectively a geometrical form having two central divided line segments each as a base thereof and with width thereof gradually decreased in position detecting direction and two geometrical forms having a divided line segment on each side as a base thereof and with width thereof gradually decreased in position detecting direction, wherein the first photoelectric conversion unit comprises two geometrical forms each on one side and having width thereof gradually decreased in positive position detecting direction of one of the divided portions and the remaining part of the portion except the two geometrical forms and having width thereof gradually decreased in negative position detecting direction of the other of the divided portions, and the second photoelectric conversion unit comprises the remaining part of the portion except two geometrical forms each on one side and having width thereof gradually decreased in positive position detecting direction of one of the divided portions and two geometrical forms one on each side and having width thereof gradually decreased in negative position detecting direction of the other of the divided portions. The present invention further provides the beam position detector as described above, wherein two or more geometrical forms each having a part of the division line as a base thereof and having a portion with width thereof gradually decreased in position detecting direction are formed on each of the divided portions, the division line is equally divided to sectors in multiple number of 4, and the geometrical form having a portion with width thereof gradually decreased in the position detecting direction has two divided line segments for every two other divided line segment except the one divided line segment on each end of the division line as a base thereof. Further, the present invention provides the beam position detector as described above, wherein there are further provided a signal processing unit for detecting a light beam incident position based on a signal from the photodetection unit and a display unit for displaying information relating to the projecting position of the laser beam based on a signal from the signal processing unit. Scanning position of the laser beam is detected by comparing the output value of the first photoelectric conversion unit with the output value of the second photoelectric conversion unit. Even when a shadow is formed on the photodetection unit, it is formed evenly over the first photoelectric conversion unit and the second photoelectric conversion unit, and it does not adversely affect the detection of the center position.

BRIEF DESCRIPTION OF THE DRAWINGS

FIG. 4 (A) and FIG. 4 (B) each represents a drawing to show a second aspect of the photodetection unit in the beam position detector;

FIG. 7 represents drawings to show operation of laser beam position detection of a conventional example. FIG. 7 (A) shows positional relationship of a first photoelectric conversion unit and a second photoelectric conversion unit, and FIG. 7 (B) is a diagram showing output values from the first photoelectric conversion unit and the second photoelectric conversion unit; and FIG. 8 (A), FIG. 8 (B) and FIG. 8 (C) each represents a drawing to explain the case where a shadow is formed in a conventional type photodetection unit.

DETAILED DESCRIPTION OF THE PREFERRED EMBODIMENTS

In the following, description will be given on embodiments of the present invention referring to the attached drawings.

Figure 1:
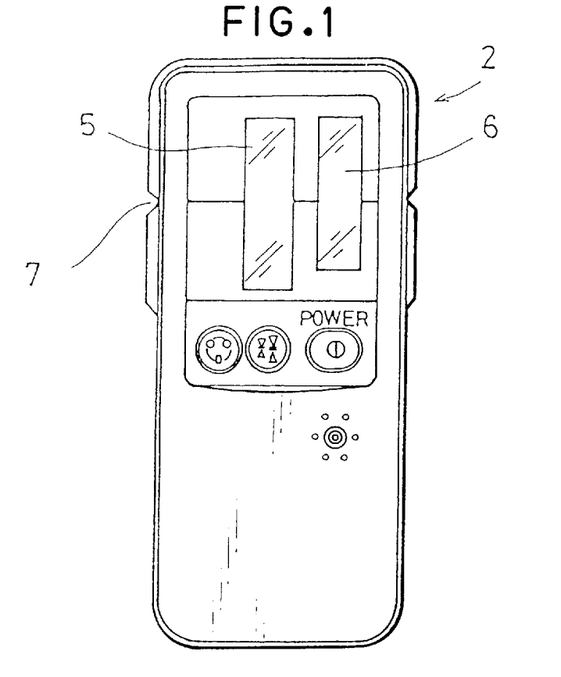
FIG. 1 is a front view of a beam position detector according to an embodiment of the present invention.

FIG. 1 represents a beam position detector 2 according to the present invention. In FIG. 1, the same component as in FIG. 6 is referred by the same symbol.

Figure 2:
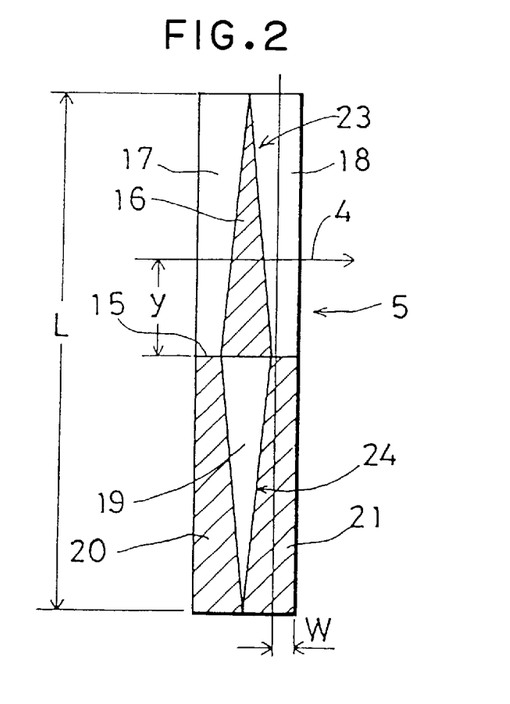
FIG. 2 is a drawing to explain a first aspect of a photodetection unit in the beam position detector.

A photodetection unit 5 to be provided in the beam position detector 2 is shown in FIG. 2. The photodetection unit 5 is divided symmetrically in vertical direction. Each of an upper portion and a lower portion of the photodetection unit 5 is further subdivided into a plurality of sectors, and the subdivided sectors are symmetrically arranged in horizontal direction.

Various divided forms can be designed. Basically, the photodetection unit, which receives a laser beam and issues a signal corresponding to the photodetection amount (received light quantity), is divided symmetrically with respect to a division line which is approximately in parallel to laser scanning direction, and the divided portion is further subdivided into a plurality of sectors. At least one of the subdivided sectors in one of the divided portions has a geometrical form having a part of the above division line as its base and with its width gradually decreased in positive position detecting direction (+y direction in FIG. 2), and at least one of the subdivided sectors in the other of the divided portions has a common base with the above form and has a geometrical form with its width gradually decreased in negative position detecting direction (−y direction in FIG. 2). The base as described above is equal in length to the remaining part of the above division line.

The form of one of the subdivided sectors with its width gradually decreased in positive position detecting direction and the subdivided remaining part of the other of the subdivided sectors constitute a first photoelectric conversion unit. Further, the form of the other of the subdivided sectors with its width gradually decreased in negative position detecting direction and the remaining part of one of the subdivided sectors constitute a second photoelectric conversion unit. The width of the first photoelectric conversion unit is gradually decreased in a positive direction perpendicular to the division line, and the width of the second photoelectric conversion unit is gradually increased.

In the following, description will be given on an aspect of division shown in FIG. 2.

First, the division of the upper portion will be described.

A horizontal division line 15 dividing the photodetection unit 5 to upper and lower portions is divided into four equal line segments. The upper portion of the photodetection unit 5 is divided to an erected triangle 16 having two divided line segments at the central portion of the horizontal division line 15 as its base and the center of the upper side of the photodetection unit 5 as its vertex, and to inverted trapezoids 17 and 18, which are formed at left and right of the erected triangle 16 respectively.

The lower portion of the photodetection unit 5 is symmetrical to the upper portion. It is divided into three sectors, i.e. an inverted triangle 19, which has two divided line segments at the central portion as its base and has the center of the lower side of the photodetection unit 5 as its vertex, and into erected trapezoids 20 and 21 formed at left and right of the inverted triangle 19 respectively.

The erected triangle 16 and the erected trapezoids 20 and 21 constitute a first photoelectric conversion unit 23 (hatched portion in the figure), and the inverted triangle 19 and the inverted trapezoids 17 and 18 constitute a second photoelectric conversion unit 24 (non-hatched portion in the figure).

Figure 3:
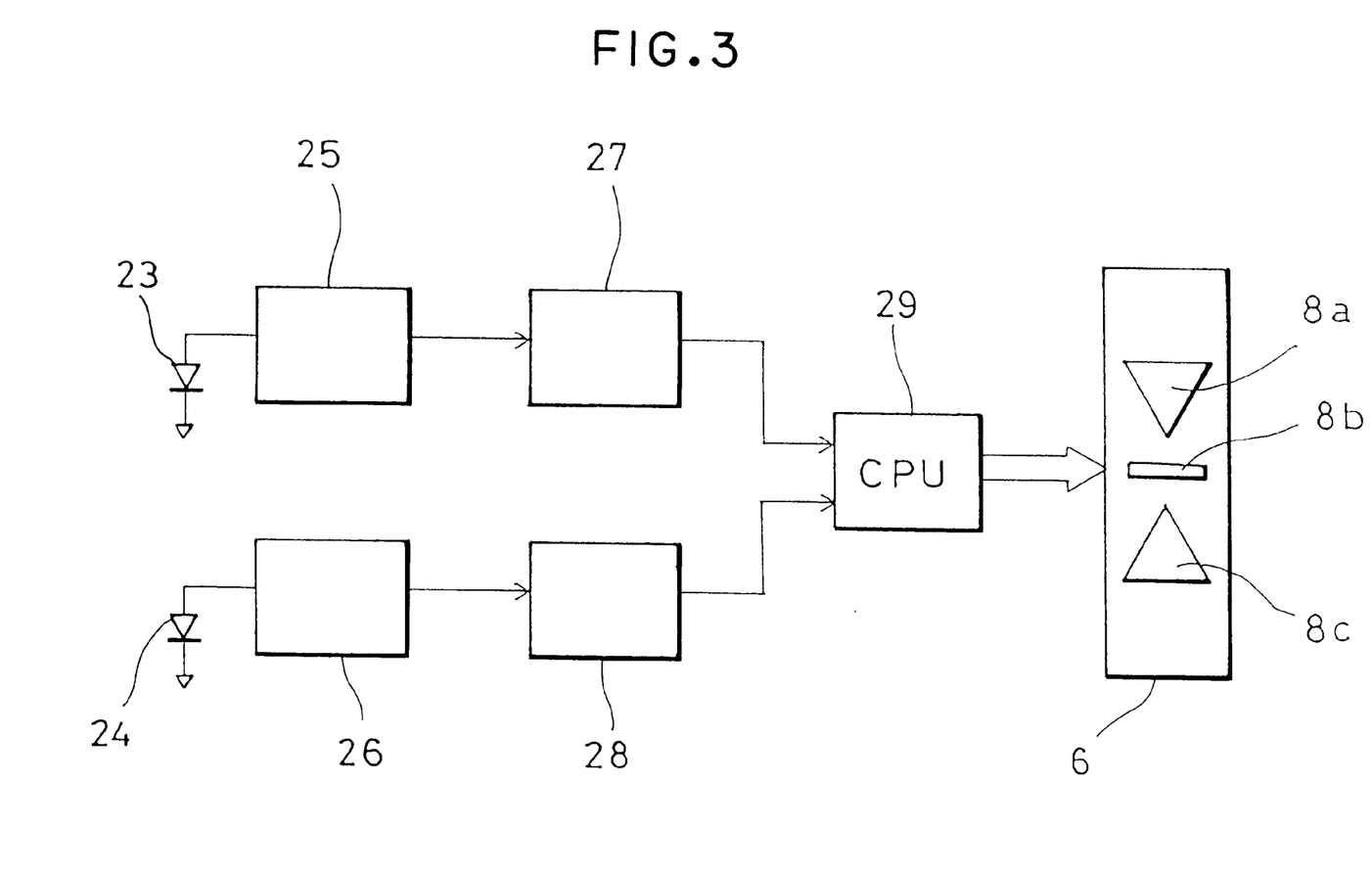
FIG. 3 is a block diagram of beam position detection of the beam position detector of the laser survey system.

Referring to FIG. 3, description will be given on a block diagram for beam position detection of the beam position detector.

A photodetection signal from the first photoelectric conversion unit 23 is inputted to an amplifier 25. After being amplified by the amplifier 25, it is inputted to a first peak hold unit 27. At the first peak hold unit 27, a first maximum photodetection amount is detected, and the detected first maximum photodetection value is inputted to an arithmetic unit 29.

A photodetection signal from the second photoelectric conversion unit 24 is inputted to an amplifier 26. After being amplified by the amplifier 26, it is inputted to a second peak hold unit 28. At the second peak hold unit 27, a second maximum photodetection value is detected, and the detected second maximum photodetection value is inputted to the arithmetic unit 29. At the arithmetic unit 29, the first maximum photodetection value is compared with the second maximum photodetection value. If there is a deviation between the two values, one of display patterns 8a or 8c on the display unit 6 is turned on depending upon the condition of deviation, and a direction is displayed, toward which the beam position detector 2 should move. In case there is no deviation between the first maximum photodetection value and the second maximum photodetection value, a display pattern 8b is turned on, and it is indicated that scanning position of the laser beam 4 is adequate.

In case the laser beam 4 scans over the center of the photodetection unit 5 in left-right direction (in horizontal direction), output value from the first photoelectric conversion unit 23 is made equal to output value from the second photoelectric conversion unit 24. Further, if the laser beam 4 is moved in vertical direction (i.e. in position detecting direction) with respect to the photodetection unit 5, e.g. if it is moved downward (in negative position detecting direction), the output value of the first photoelectric conversion unit 23 is increased, and the output value of the second photoelectric conversion unit 24 is decreased.

If it is supposed that output value of the second photoelectric conversion unit 24 is A, that the output value of the first photoelectric conversion unit 23 is B, and that the height of the photodetection unit 5 is L, positional displacement y (in vertical direction from the center of the photodetection unit 5) of the laser beam 4 scanning the photodetection unit 5 is given by the following equation (1):

$$y = L \times \{A/(A+B)\} - L/2$$

As described above, the output of the first photoelectric conversion unit 23 is inputted to the arithmetic unit 29 via the amplifier 25 and the first peak hold unit 27, and the output from the second photoelectric conversion unit 24 is inputted to the arithmetic unit 29 via the amplifier 26 and the second peak hold unit 28. Then, these values are relatively compared by comparison arithmetic operation using the arithmetic unit 29. Based on the comparison arithmetic operation, the display unit 6 is driven.

It is now assumed that, in the photodetection unit 5 shown in FIG. 2, a shadow 13 formed by the beam position detector 2 itself covers a portion "W" at right side of the photodetection unit 5 in the figure. The shadow formed by the beam position detector 2 runs in parallel to position measuring direction and perpendicularly to scanning direction of the laser beam 4. Because the first photoelectric conversion unit 23 and the second photoelectric conversion unit 24 are symmetrical to each other with respect to the horizontal division line 15, area of each region invalidated by the shadow 13 is identical to each other in these two units, and the condition of invalidation is also identical. Further, at the central portion, which is the most important in position detection, output value of the first photoelectric conversion unit 23 is identical with that of the second photoelectric conversion unit 24. Thus, regardless of whether the shadow 13 is present or not, it is possible to accurately detect the position of the center of the photodetection unit 5.

In case the scanning position of the laser beam 4 is deviated from the graphical center of the photodetection unit 5, e.g. in case it is lower (deviated in negative position detecting direction) than the graphical center, the ratio of the output of the second photoelectric conversion unit 24 is increased compared with the case where the shadow 13 is not formed. However, there is no change in the direction, in which the beam position detector 2 should be moved, and the display unit 6 is driven, and the display pattern 8a is turned on. Accordingly, no trouble occurs in the measurement.

Figure 4A:
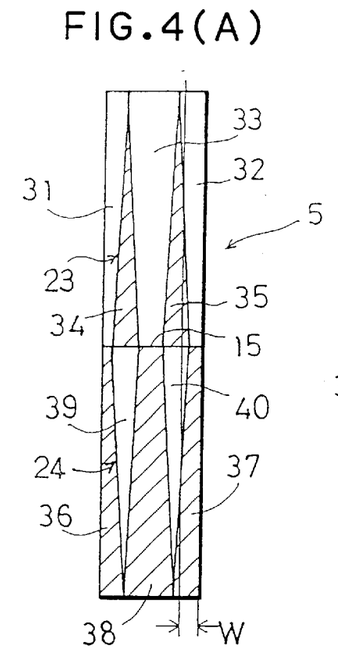

FIG. 4 (A) shows another aspect of the division to the upper and the lower portions. In the aspect shown in FIG. 4 (A), another photodetection unit is added in horizontal direction to the photodetection unit 5 shown in FIG. 2.

Description will be given now on the division of the upper portion. The horizontal division line 15 dividing the photodetection unit 5 to upper and lower portions is divided into eight equal line segments, and its upper side is divided into four equal line segments. The upper portion of the photodetection unit 5 is divided in such manner that two inverted trapezoids 31 and 32 are formed, each of which has a divided line segment of ⅛ of the total length of the horizontal division line 15 each at left and right respectively as its base and has a divided line segment of ¼ each at left and right of the upper side of the photodetection unit 5 as its upper side respectively, and that an inverted trapezoid 33 is formed, which has the line segment of ¼ at the central portion of the horizontal division line 15 as its base and has a divided line segment of ½ of the upper side of the photodetection unit 5 as its upper side. Then, with the inverted trapezoid 33 therebetween, two erected triangles 34 and 35 are formed at left and right respectively, each of which has a divided line segment of ¼ of the horizontal division line as its base and has its vertex at a position at ¼ of total length from each end of the upper side of the photodetection unit 5. Thus, the upper portion of the photodetection unit 5 is divided to three inverted trapezoids 31, 33 and 32 and two erected triangles 34 and 35.

The lower portion of the photodetection unit 5 is symmetrical to the upper portion. That is, two erected trapezoids 36 and 37 are formed at left and right of the horizontal division line 15, each having the divided line segment at ⅛ each at left and right of the horizontal division line 15 as its upper side and having the divided line segment at ¼ at left and right of the lower side of the photodetection unit 5 as its base. Further, an erected trapezoid 38 is formed, which has the divided line segment at ¼ at the central portion of the horizontal division line 15 as its upper side and has the divided line segment at ½ of the lower side of the photodetection unit 5 as its base. With the erected trapezoid 38 therebetween at left and right, two inverted triangles 39 and 40 are formed respectively, each of which has a divided line segment of ¼ of the horizontal division line 15 as its upper side and has a vertex at a position at ¼ from each of the lower side of the photodetection unit 5. Thus, the lower portion of the photodetection unit 5 is divided to three erected trapezoids 36, 38 and 37 and two inverted triangles 39 and 40.

The two erected triangles 34 and 35 and the three erected trapezoids 36, 38 and 37 constitute a first photoelectric conversion unit 23, and the inverted trapezoids 31, 33 and 32 and the inverted triangles 39 and 40 constitute a second photoelectric conversion unit 24.

In the present aspect of division, the number of subdivided sectors on photodetection surface on the upper and the lower portions is increased, and this means that the ratio of effective portion to ineffective portion (i.e. the portion invalidated by the shadow) is decreased. For example, in case the shadow 13 is formed in FIG. 4 and if the number of subdivisions is many, the shadow 13 covers not only the inverted trapezoid 32 but also the erected triangle 35. As a result, not only the output value of the second photoelectric conversion unit 24 but also the output value of the first photoelectric conversion unit 23 is decreased. Therefore, compared with the case where the shadow covers only one of the second photoelectric conversion unit 24 and the first photoelectric conversion unit 23, variation of output ratio is reduced, and the accuracy is improved.

Figure 4B:
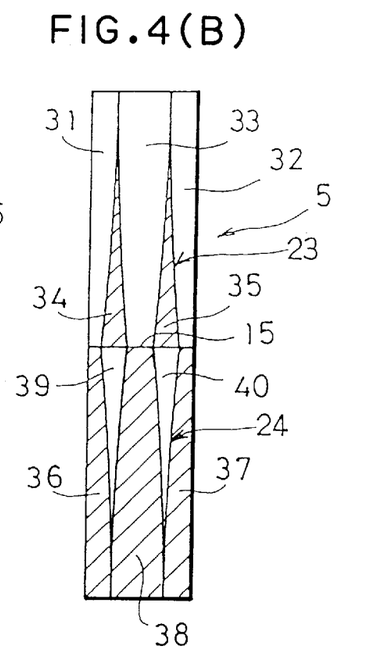

The aspect of division shown in FIG. 4 (B) is the same as that of FIG. 4 (A), while forms of vertical division lines are different. Specifically, the vertical division lines to divide the upper portion to the inverted trapezoids 31, 33 and 32 and the erected triangles 34 and 35 are designed as curved lines. The closer the vertical division lines approach the horizontal division line 15, the less a gradient of the line becomes. That is, it is designed in such manner that the closer it is to the horizontal division line 15, the more the change ratio of the length of line segment going across the inverted trapezoids 31, 33 and 32 and the erected triangles 34 and 35 is increased. By designing in such manner that the change ratio is increased near the horizontal division line 15, it is possible to increase accuracy of detection of the horizontal division line 15, i.e. accuracy of position detection. The same applies to the lower portion, and detailed description is not given here.

The vertical division line is not necessarily a curved line, and it may be designed as a straight line that is adequately bent.

Figure 5:
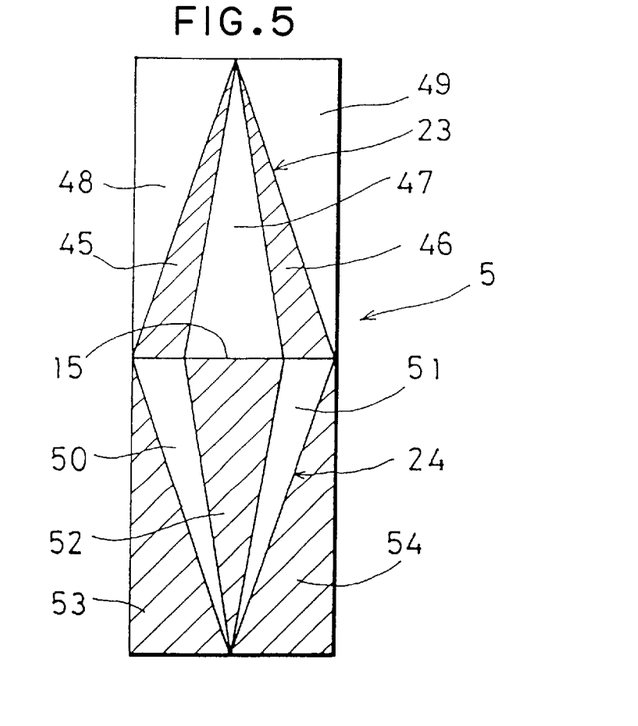
FIG. 5 is a drawing to explain a third aspect of the photodetection unit of the beam position detector.

FIG. 5 represents a third aspect of division. The horizontal division line 15 is divided into four equal line segments, and the upper portion of the photodetection unit 5 is divided to two erected triangles 45 and 46, each having a divided line segment of ¼ of total length of the horizontal division line 15 each at left and right as its base, and having the center of the upper side of the photodetection unit 5 as its vertex, an erected triangle 47 having two line segments each being ¼ of the total length at the central portion as its base, and two inverted triangles 48 and 49 at the ends. Also, the lower portion is divided to two inverted triangles 50 and 51 each having a line segment of ¼ of total length of the horizontal division line 15 each at left and right as its base and having the center of the upper side of the photodetection unit 5 as its vertex, an inverted triangle 52 having two line segments each being ¼ of total length of the horizontal division line at the center as its base, and two erected triangles 53 and 54 each at an end of the horizontal division line 15.

The two triangles 45 and 46 at left and right, the inverted triangle 52 at the center, and the two erected triangles 53 and 54 at the ends constitute a first photoelectric conversion unit 23, and the erected triangle 47, the two inverted triangles 48 and 49 at the ends and the two inverted triangles 50 and 51 constitute a second photoelectric conversion unit 24.

Further, the number of divisions of each of the upper and the lower portions is not limited to 3 divisions or 5 divisions, but these portions may be divided into 7 or 9 portions, or more. Also, the horizontal division line 15 need not be horizontal, and it will suffice as far as it is in parallel to a scanning direction of the laser beam.

As described above, it is possible according to the present invention to attain a superb effect to accurately detect the position of the laser beam even in case the laser beam obliquely enters the beam position detector and a shadow is formed on the photodetection surface.

what is claimed is:

1. A beam position detector having a photodetection unit for detecting a scanning position of a laser beam having a scanning direction, said photodetection unit adapted to issue an output signal, said detector comprising said photodetection unit formed so as to increase and decrease said output signal corresponding to said scanning position of said laser beam, wherein said photodetection unit is divided into a first divided portion and a second divided portion by a division line in parallel with said scanning direction of said laser beam, each of said first divided portion and said second divided portion being further subdivided into subdivided sectors such that each of said first divided portion and said second divided portion includes at least one triangular subdivided sector which extends in a direction perpendicular to said division line, each of said subdivided sectors of said first divided portion has a form symmetrical with the corresponding subdivided sector of said second divided portion with respect to said division line, one of two subdivided sectors being symmetrical belongs to a first photoelectric conversion unit and the other of said two of said subdivided sectors belongs to a second photoelectric conversion unit, and one of two of said subdivided sectors belongs to one of said photoelectric conversion units and the other of said two of said subdivided sectors close to said one belongs to the other of said photoelectric conversion units.

2. A beam position detector having a photodetection unit according to claim 1, wherein said first divided portion and said second divided portion are subdivided by said plurality of triangular subdivided sectors which has a base which is part of said division line.

3. A beam position detector having a photodetection unit according to claim 2, wherein each of said first and second triangular subdivided sectors has two sides and a base, and wherein said two sides of each of said first and second triangular subdivided sectors are curved lines.

4. A beam position detector having a photodetection unit for detecting a scanning position of a laser beam having a scanning direction, said photodetection unit adapted to issue an output signal, said detector comprising said photodetection unit formed so as to increase and decrease said output signal corresponding to said scanning position of said laser beam, wherein said photodetection unit is divided into a first divided portion and a second divided portion by a division line in parallel with said scanning direction of said laser beam, said division line being divided into a first divided segment, a second divided segment, a third divided segment and a fourth divided segment, each of said first, second, third and fourth divided segments having an equal length, said division line having a first side, a second side, and a center between said first and second side;

said first divided portion being divided into four sectors comprising:
a first subdivided triangular form sector having a base which is said second divided segment and said third divided segment, said second and third divided segments being located at said center of said division line,
a third subdivided triangular form sector having a base which is said first divided segment, said first divided segment being located on said first side of said division line,
a fifth subdivided triangular form sector having a base which is said fourth divided segment, said fourth divided segment being located on said second side of said division line, and
a seventh subdivided sector which makes up the remainder of said four sectors of said first divided portion;

said second divided portion is divided into four sectors comprising:
a second subdivided triangular form section having a base which is said second divided segment and said third divided segment, said second and third divided segments being located at said center of said division line,
a fourth subdivided triangular form sector having a base which is said first divided segment, said first divided segment being located on said first side of said division line,
a sixth subdivided triangular form sector having a base which is said fourth divided segment, said fourth divided segment being located on said second side of said division line, and
an eighth subdivided sector which makes up the remainder of said four sectors of said divided portion;

said third subdivided triangular form sector, said fifth subdivided triangular form sector, said second subdivided triangular form sector and said eighth subdivided triangular form sector constituting a first photoelectric conversion unit, said first subdivided triangular form sector, said fourth subdivided triangular form sector, said sixth triangular form sector and said seventh triangular form sector constituting a second photoelectric conversion unit; and said first divided portion and said second divided portion are divided into subdivided sectors such that the said first divided portion and said second divided portion are symmetrical with respect to said division line.

* * * * *